United States Patent [19]
Takeuchi

[11] 3,886,538
[45] May 27, 1975

[54] ALARM SENDING AND RECEIVING SYSTEM INCORPORATED IN A CATV SYSTEM

[75] Inventor: Takeshi Takeuchi, Yokohama, Japan

[73] Assignee: Hochiki Corporation, Tokyo, Japan

[22] Filed: May 11, 1973

[21] Appl. No.: 359,257

[30] Foreign Application Priority Data
May 13, 1972 Japan .................. 47-46888

[52] U.S. Cl. ............. 340/310 R; 325/308; 340/224; 340/216
[51] Int. Cl. ................ G08b 21/00
[58] Field of Search ........... 340/213, 216, 224, 416, 340/286, 310 R; 325/308

[56] References Cited
UNITED STATES PATENTS

| | | | |
|---|---|---|---|
| 3,064,195 | 11/1962 | Freen | 325/308 |
| 3,388,389 | 6/1968 | Henriques | 340/216 |
| 3,399,397 | 8/1968 | Josephson | 340/416 |
| 3,423,521 | 1/1969 | Friesen et al. | 340/286 |
| 3,460,121 | 8/1969 | Wattenburg | 340/216 |
| 3,631,433 | 12/1971 | Dix | 340/216 |
| 3,739,283 | 6/1973 | Colligan | 325/308 |
| 3,761,914 | 9/1973 | Hardy et al. | 340/310 |
| 3,803,491 | 4/1973 | Osborn | 325/308 |

*Primary Examiner*—Thomas B. Habecker
*Attorney, Agent, or Firm*—Frank J. Jordan

[57] ABSTRACT

An alarm sending and receiving system incorporated in a CATV system includes a signal generator in each of the subscriber ends of a CATV system generating an alarm signal ranging in a low frequency band which can be separated from signals ranging in frequency bands for television signals, and at an optional point of the CATV system, a receiver is provided for receiving the alarm signal in such a manner that the signal generator is connected to the CATV system through a switch-gear which is always open while the receiver is connected directly to the CATV system, and arranging filters in the CATV system, whereby when an alarm is actuated signal a closed circuit is formed only between the receiver and the signal generator operated in the CATV system.

5 Claims, 5 Drawing Figures

ALARM SENDING AND RECEIVING SYSTEM INCORPORATED IN A CATV SYSTEM

The present invention relates to an alarm sending and receiving system for warning of a fire, crime or the like and is capable of being incorporated in a CATV system.

A CATV system which allows electromagnetic waves for television to be received through a community antenna and to be transmitted to each of the subscribers has become essential to a multi-storied building or the like. Some attempts have been made to send through a CATV system an alarm signal for informing the occurrence of a fire, crime or the like, but the prior art systems comprised providing an alarm receiving device in the head end of a CATV system, to which alarm signals are sent from each of the subscriber ends.

The accompanying drawings show an alarm sending and receiving system of the present invention, in which FIG. 1 is a block diagram showing a CATV system having incorporated therein an alarm sending and receiving system;

The prior art systems as stated above have the following technical disadvantage to be overcome. Namely, although the alarm receiving device is preferably disposed by the side of the caretaker of a building, it does not necessarily follow that the room in which the head end of the CATV system is arranged is the caretaker's private room. Therefore, it is preferable to provide that the alarm receiving device can be disposed in an optional room in the building which is used as the caretaker's private room, in other words, at an optional point of the CATV system. Accordingly an object of the present invention is to provide an alarm sending and receiving system incorporated in a CATV system and which is capable of sending to any optional point of a CATV system alarm signals for informing the occurrence of a fire, crime, or the like.

One of the embodiments of the present invention will now be described with reference to accompanying drawings.

Figure 1:
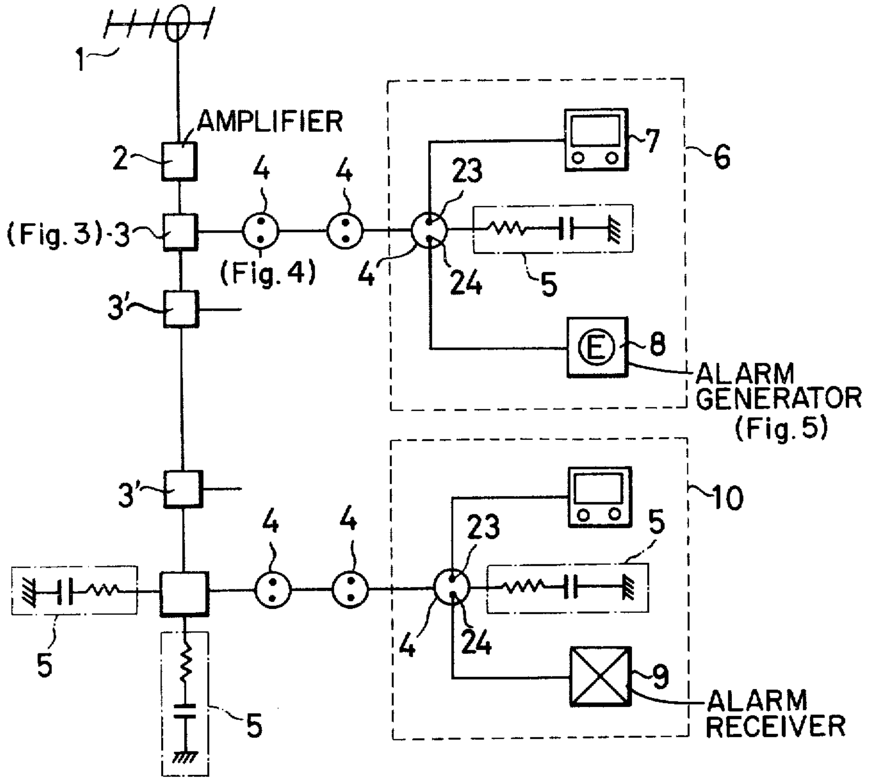

FIG. 1 shows a system having the alarm sending and receiving system of the present invention incorporated in a CATV system wherein reference numeral 1 represents a master antenna, 2 an amplifier, 3 and 3' signal bridging devices which can be used for the bi-directional system, 4 and 4' subscriber's terminals (serial units) which can be also used for the bi-directional system, 5 a dummy whose end is a free terminal and which can be also used for the bi-directional system, and 6 a subscriber's house. The subscriber's terminal 4 is attached to a television signal receiving terminal 23 and an alarming terminal 24 in the house and which are respectively, connected to a television set 7 and as alarm signal generator 8. The numeral 10 is an optional room in a building which is used as the caretaker's private room and in which a television signal receiving terminal 23 and an alarming terminal 24, both attached to the subscriber's terminal 4, are connected to a television set 7 and an alarm receiver 9, respectively.

Figure 2:
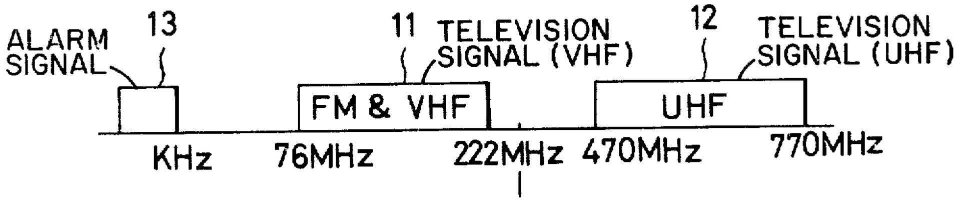
FIG. 2 is a view showing various frequency bands.

The frequency bands which can be used in such CATV system will now be described with reference to FIG. 2. Reference numeral 11 denotes a frequency band for use in FM radio and VHF television ranging from 76MHZ to 222MHZ, and 12 a frequency band for UHF television ranging from 470MHZ to 770MHZ. Namely, these frequency bands are used for transmitting aural and video signals. On the other hand, for the frequency band used in the alarm signal generator incorporated in the CATV system there is selected a low frequency band 13 so apart from the band 11 for VHF television signals as to allow separating and mixing of frequencies to be fully effected through a separating and mixing circuit.

Figure 3:
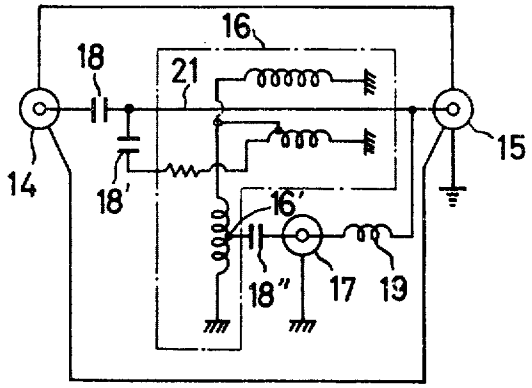
FIG. 3 is a circuit diagram showing a bridging device.
Figure 4:
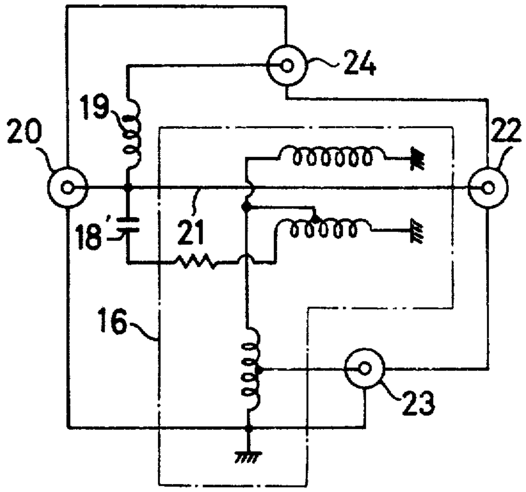
FIG. 4 is a circuit diagram of a subscriber's terminal.

FIGS. 3 and 4 show bridging devices used in this CATV system having the alarm sending and receiving system incorporated therein. FIG. 3 is a circuit diagram of the bridging device 3 in the CATV system as shown in FIG. 1. An input terminal 14 and an output terminal 15 are connected with each other through a trunk line 21 to which a directional coupling circuit 16 is arranged so as to bridge signals transmitted through the antenna to a bridging terminal 17. The trunk line 21 is provided with a filter 18 by the side of the input terminal 14, said filter 18 permitting signals in the frequency bands 11 and 12 as shown in FIG. 2 to pass therethrough but preventing signals in the frequency band 13. In the connection line between the trunk line 21 and the coupling circuit 16 there is provided a similar filter 18' and between an output end 16' of the coupling circuit and the bridging terminal 17 a similar filter 18''. Between the bridging terminal 17 and the output terminal 15 there is provided a filter 19 for preventing signals transmitted through the antenna but allowing signals in the frequency band 13 to pass therethrough.

The bridging device 3' as shown in FIG. 1 corresponds to that of FIG. 3 except that the filter 18 is removed, and in this case it is not necessary to connect one end of the filter 19 particularly to the output terminal 15, but the end of the filter 19 may be connected to any optional point of the trunk line 21.

Bridging devices having such circuits as described above function as follows. Main signals of those transmitted through the antenna are guided through the input terminal 14, the filter 18, the coupling circuit 16 attached to the trunk line 21, to the output terminal 15, while a part of the signals pass through the filter 18', the coupling circuit 16, to the output end 16' of the coupling circuit at a predetermined coupling ratio, and then through the filter 18'' to the bridging terminal 17. Alarm signals in the frequency band 13 which are carried through the bridging terminal 17 are sent through the filter 19 to the trunk line 21 without loss, and then to the output terminal 15. The filter 18'' does not allow these alarm signals through the bridging terminal 17 to be carried to the output end 16' of the coupling circuit, thus resulting in no loss of the signals to the side of the coupling circuit. The coupling circuit 16 is so arranged as to effect an electromagnetic coupling to the signals in the frequency bands 11 and 12, but not to the signals in the frequency band 13, much lower than those 11 and 12, thus resulting in no loss of energy. The filter 18 at the side of the input terminal prevents alarm signals from being carried to the side of the antenna.

In the case of the bridging device 3' as shown in FIG. 1 in which the filter 18 is not provided, the flow of signals of the frequency band 13 through the bridging terminal 17 is approximately the same as that in the device as stated above, but these signals flow from the input terminal 14 to the output terminal 15 or adversely from the output terminal 15 to the input terminal 14 and a part of these signals are sent through the filter 19 to the bridging terminal 17. In this case, however, filters 18′ and 18″ prevent energy from being lost through the coupling circuit 16 to ground and the coupling circuit 16 itself does not effect the electromagnetic coupling to low frequencies as explained above, so that no loss of energy occurs in the circuit.

FIG. 4 shows one of the circuits of the subscriber's terminal 4 as shown in FIG. 1. Each of the subscriber's terminals will now be explained with reference to this circuit. Signals in the frequency bands 11 and 12 which come through the antenna flow through an input terminal 20, the trunk line 21 and an output terminal 22 to devices at the subsequent stage. A part of these signals are carried through the coupling circuit 16, which is attached to the trunk line 21 to effect the electromagnetic coupling to signals of the frequency bands 11 and 12, the filter 18′, which allows these television signals to pass therethrough, to a bridging terminal 23. In each of subscriber's terminals there is provided a connection terminal 24 for permitting alarm signals of the frequency band 13 to come into the circuit, and these alarm signals flow through the filter 19, the trunk line 21 to the input and output terminals 20 and 22. In this case alarm signals are prevented by the filter 18′ and are not electromagnetically coupled by the directional coupling circuit 16, thus resulting in no loss of energy, while television signals of the frequency bands 11 and 12 are not allowed by the filter 19 to flow through the trunk line 21 to the terminal 24, so that no loss of energy occurs, too. When signals of the frequency band 13 come into the input and output terminals of the trunk line, they pass through the filter 19 and are picked up by the terminal 24 to be transmitted to the alarm receiver. In this case, too, they are held back by the filter 18′ and the coupling circuit 16 as described above, and not allowed to flow to the terminal 23.

Figure 5:
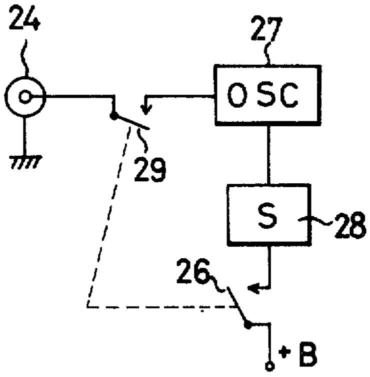
FIG. 5 is a block diagram showing an alarm signal generator.

FIG. 5 shows one of the circuits of the alarm signal generator 8. To the alarm terminal 24 there is connected a signal oscillator 27 which is oscillated by frequencies in the band 13 and to which a power source 28 is connected. Between the alarm terminal 24 and the oscillator 27, and between an external power source B and the power source 28 are provided switchgears 29 and 26, respectively. These switchgears 29 and 26 are normally always opened, but manually or automatically closed at the same time or in turn when an alarm is to be sent.

The function of the alarm sending and receiving system incorporated in the CATV system having the construction as described above will now be described. Television signals sent through the antenna are amplified by the amplifier 2 to be the predetermined signal strength, and carried via the bridging device system 3-3′ and the subscriber's terminal system 4-4′ to the terminal 23 of each of the subscriber's terminals 4 without loss as explained above. When the alarm signal generator 8 connected to the terminal 24 of any one of the subscriber's terminals 4 is activated by any one of the subscribers, an alarm signal comes into the alarm terminal 24. This alarm signal is not carried through the terminal 23 to the television set for the reason as stated above and does not flow to ground, since the dummy circuit 5 having a free terminal holds back the alarm signal. It is also evident from the explanation as mentioned above that the alarm signal does not flow at the subscriber's terminal 4 to the side of the terminal 23. Though the alarm signal reaches the terminal 24, the switchgears at the output side of the alarm generator 8 are always kept opened, so that no loss of energy occurs. The bridging devices 3 and 3′ serve to let the alarm signal flow through the bridging terminal 17 to the trunk line 21 with good efficiency. The switchgears at the input side of the receiver 9 which is disposed in an optional location such as the caretaker's private room are connected in an always-opened state to the terminal 24 of the subscriber's terminal 4 and, therefore, are in a state capable of always receiving the alarm signal. As stated above, a CATV system having the alarm sending and receiving system of the present invention incorporated therein comprises forming a closed circuit between the optionally activated alarm generator and the receiver provided in an optional place, using a specified frequency, e.g., the frequency band 13 in the present invention, and, therefore, the CATV system can be used without any changes to the system as the alarm sending and receiving system which permits signals except television signals to be transmitted from a plurality of optional places to the receiver disposed in an optional place. In addition, the devices required in a CATV system having the alarm sending and receiving system of the present invention incorporated therein are completed only by adding some simple filters thereto, and it is not necessary to arrange the alarm sending and receiving system individually separated from the CATV system, which has been the arrangement in the prior art. Accordingly, the alarm sending and receiving system of the present invention can be provided at a much lower cost. The CATV system is always sending video signals therethrough to the subscriber's television sets, so that the alarm sending and receiving system incorporated in the CATV system is considered to be always checked as to its operability. This provides an advantage to the alarm sending and receiving system which is required to function only at the time of emergency and assures a high reliability of the system.

When a specified frequency is arranged respectively to each of the subscriber's signal generators and a receiving circuit to respond to each of specified frequencies is provided respectively in the receiver, it becomes possible to know which generator has sent the alarm signal. If the signal generators 8 and the receiver 9 are so arranged as to have a signal sending and receiving function, it is also possible to send a reply signal from the receiver side in the caretaker's private room to any one of the subscriber's signal generators. Further, if a private broadcasting apparatus for use in video and audio signals is added to the CATV system having the alarm sending and receiving system incorporated therein, video and audio signals can be sent from the caretaker's private room to the television sets, FM radios, or the like at the subscriber side. In this case it is also possible to send a signal which enforces any one of the power sources of the subscriber's television sets into an on-condition. When a signal is sent from the receiver in the caretaker's private room to any one of the subscriber's television sets, it may be that the television set considered is set to receive video signals from a different channel. However, the television set may be so arranged as to be re-set to receive video signals from a specified channel when the signal has been received by the receiving circuit provided in the alarm signal generator. Instead of this, it is also possible to erase video and audio signals at the head end portion and to enforcedly offer alarming audio signals at the same time to all of television channels. As stated above, the alarm sending and receiving system of the present invention comprising incorporation the alarm system into a CATV system can be used for various purposes and achieve the most satisfactory alarm transmission.

What is claimed is:

1. An alarm sending and receiving system incorporated in a CATV system which transmits broadcasting signals within one frequency range via a trunk line to a plurality of subscribers, comprising an alarm signal generating means at the subscriber ends of the CATV system for generating an alarm signal in a frequency range lower than said first mentioned frequency range and which can be fully separated from said broadcasting signals, an alarm receiver means adapted to be located at any desirable optionally selected location for receiving the alarm signals from said alarm signal generating means, a bridging means associated with said trunk line and provided with a first coupling circuit means cooperating electromagnetically with said trunk line to pass only said broadcast signals, said bridging means also comprising an input terminal and an output terminal on said trunk line and a first bridging terminal, said first coupling circuit means being operatively associated with said trunk line so as to bridge to said bridging terminal said broadcast signals, said bridging means further comprising a first filter between said first bridging terminal and said output terminal to pass only alarm signals of said lower frequency range, a subscriber's terminal circuit comprising an input terminal and an output terminal on said trunk line, a second coupling circuit means operatively associated with said trunk line to effect an electromagnetic coupling for said broadcast signals, a second bridging terminal, a second filter between said trunk line and said second coupling circuit means operable to pass broadcast signals to said bridging terminal means, an alarm connection terminal, and a third filter between said alarm connection terminal and said trunk line for passing alarm signals and preventing passage of said broadcast signals, whereby actuation of an alarm generating signal at one of said alarm signal generating means provides a closed circuit for the alarm signal only between said actuated alarm signal generating means and said receiver means.

2. An alarm sending and receiving system according to claim 1 wherein one of said bridging means includes a filter (18) at the side of said input terminal (14) which passes signals of said broadcast range but which prevents passage of signals in said lower frequency range.

3. An alarm sending and receiving system according to claim 1 wherein said coupling circuit (16) includes an output (16'), a second filter device (18'') between said coupling circuit output (16') and said bridging terminal (17), a third filter (18') in said connection means between said trunk line (21) and said coupling circuit (16), said first filter device (19) being located between said bridging terminal (17) and said output terminal (15), said first filter device (19) passing signals in said lower frequency range but preventing passage of signals in said broadcast range.

4. An alarm sending and receiving system according to claim 1 including a signal oscillator (27) connected to said alarm connection terminal (24), said oscillator (27) being oscillated by frequencies in said lower frequency range, a power source (28) for said oscillator (27), switch means (29) between said alarm connection terminal (24) and said oscillator (27), a switch means (26) between said power source (28) and an external power source (13), whereby said two switch means (29, 26) are always open when a non-alarm condition exists.

5. An alarm sending and receiving system according to claim 1 wherein each of said alarm signal generating means is operable at a specified different frequency, thereby permitting determination of the location of the specific alarm signal generating means which sends an alarm signal.

* * * * *